United States Patent [19]

Hartmann et al.

[11] 4,029,296
[45] June 14, 1977

[54] DIAPHRAGM VALVE ARRANGEMENT

[75] Inventors: Ewald Hartmann, Cologne, Germany; Hendrik De Bliek, Bereldange, Luxembourg

[73] Assignees: Fonderie et Ateliers de Mersch S.A., Mersch, Luxembourg; Clouth Gummiwerke AG, Cologne, Germany

[22] Filed: Nov. 21, 1975

[21] Appl. No.: 634,235

[30] Foreign Application Priority Data

Nov. 22, 1974 Germany .......................... 2455329

[52] U.S. Cl. .............................................. 251/331
[51] Int. Cl.² .......................................... F16K 7/16
[58] Field of Search ............... 251/331; 92/98 R

[56] References Cited

UNITED STATES PATENTS

| 2,659,565 | 11/1953 | Johnson et al. | 251/331 |
| 2,988,322 | 6/1961 | Anderson | 251/331 |
| 3,067,764 | 12/1962 | Geary | 251/331 X |
| 3,151,838 | 10/1964 | Tripoli et al. | 251/331 X |

FOREIGN PATENTS OR APPLICATIONS

| 1,406,016 | 6/1965 | France | 251/331 |
| 1,294,936 | 11/1972 | United Kingdom | 251/331 |

*Primary Examiner*—Arnold Rosenthal
*Attorney, Agent, or Firm*—Michael J. Striker

[57] ABSTRACT

A diaphragm valve arrangement includes a pair of clamping members which have respective juxtaposed surfaces which define with one another a gap and which also bound an interior space. One of the juxtaposed surfaces has a projecting portion which extends across the gap towards the other of the juxtaposed surfaces. The arrangement also includes a diaphragm which has a center portion spanning the interior space and an outer clamped portion which is located in the gap and which is in part provided with a region of lesser thickness as compared with the thickness of the center portion of the diaphragm. The projecting portion is lodged in the recess formed in the region of lesser thickness.

14 Claims, 4 Drawing Figures

DIAPHRAGM VALVE ARRANGEMENT

BACKGROUND OF THE INVENTION

The present invention relates to a diaphragm valve arrangement.

Diaphragm valves are known. Such a valve arrangement generally comprises a flexible diaphragm which actuates a member depending upon the pressures which exist on the opposite sides of the diaphragm. Thus, it will be readily appreciated that it is very important that the diaphragm, which is clamped at its outer region between two juxtaposed clamping members so as to seal the pressure compartments existing on opposite sides of the diaphragm and so as to thereby prevent pressure from leaking past the latter, be fully functional even after having been assembled in the valve arrangement for long periods of time.

In the prior art, the rubber material of the diaphragm located in its clamped portion has a tendency to flow. Thus, over time, the sealing capability of the diaphragm will worsen and gradually deteriorate so that eventually the entire valve arrangement will be inoperative. This time period is shortened in those cases where the diaphragm is subjected to elevated temperatures and pressures.

SUMMARY OF THE INVENTION

Accordingly, it is a general object of the present invention to overcome the disadvantages of the prior art.

Another object of the present invention is to provide a diaphragm which can maintain an effective seal even after the diaphragm has been clamped between opposing clamping members for long periods of time.

Another object of the present invention is to prevent the material of the clamped portion of a diaphragm from flowing and thereby deforming the latter.

An additional object of the present invention is to provide a diaphragm which can maintain a reliable seal even though the diaphragm is subjected to elevated temperatures.

Still a further object of the present invention is to provide a diaphragm which can maintain a reliable seal even though the diaphragm is subjected to elevated pressures.

Yet another object of the present invention is to provide a long lasting diaphragm which does not require frequent maintenance.

In keeping with these objects, and others which will become apparent hereinafter, one feature of the invention resides in a combination in a diaphragm valve arrangement including a pair of clamping members which have respective juxtaposed surfaces which define with one another a gap and which bound an interior space. One of the surfaces has a projecting portion which extends across the gap towards the other of the surfaces. The diaphragm valve arrangement also includes a diaphragm having a center portion which spans the interior space and an outer clamped portion which is located in the gap and which in part has a region of lesser thickness than that of the center portion of the diaphragm so as to be formed with a recess in which the projecting portion is lodged.

These features achieve the aforementioned objects and overcome the cited drawbacks of the prior art in a novel manner. Since the outer clamped portion of the diaphragm has a recessed region of lesser thickness as compared with the thickness of the adjacent center portion of the diaphragm, there will be comparatively less material in this recessed region. Thus, after receiving the projecting portion of one of the clamping members in this recessed region, the lesser amount of material of the diaphragm in the recessed region has a substantially reduced tendency to escape this recessed region i.e., to flow therefrom.

This feature assures that the diaphragm of the valve arrangement will maintain its sealing function. It is no longer necessary to retighten the clamping members after having been assembled for long periods of time. The long lasting diaphragm thus does not require the expense and time generally spent in frequently repairing the prior art arrangements. Also, reliable operation is assured for longer periods of time.

Another feature of the invention is embodied in providing a region of greater thickness as compared with the thickness of the center portion of the diaphragm outwardly adjacent the recessed region. This region of greater thickness serves to additionally seal and fix the diaphragm in place. Moreover, this latter region of greater thickness is lodged in a correspondingly-shaped cavity formed by the juxtaposed clamping members. A cutout is provided in one of the clamping members which is bounded by a side wall of an extension which is provided on the other of the clamping members. The cavity thus produced tends to oppose a deformation of the region of greater thickness.

In accordance with the invention, the region of lesser thickness may have a generally constant thickness or the thickness may vary in size. In the latter case, the thickness of the recessed region may increase as one goes from the interior to the exterior of the diaphragm valve arrangement, or vice versa. In either event, the material in the recessed region has an even greater tendency not to flow therefrom.

Still a further feature of the invention is embodied in providing sealing ribs on the underside of the recessed region for improving the sealing capability of the diaphragm.

Finally, in accordance with yet another feature of the present invention, it is highly desirable to provide another projecting portion on the other of the clamping surfaces which also extends across the gap towards the first mentioned surface. The region of lesser thickness is, in this case, formed with an additional recess which has an open side that faces towards the other projecting portion and in which the latter is lodged. Thus, two parallel projections are spaced adjacent each other and are lodged in two parallel recesses provided in the recessed region of lesser thickness of the diaphragm. This diaphragm shape has proven to be even more reliable than the previously described embodiments in preventing the flow of material therefrom.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
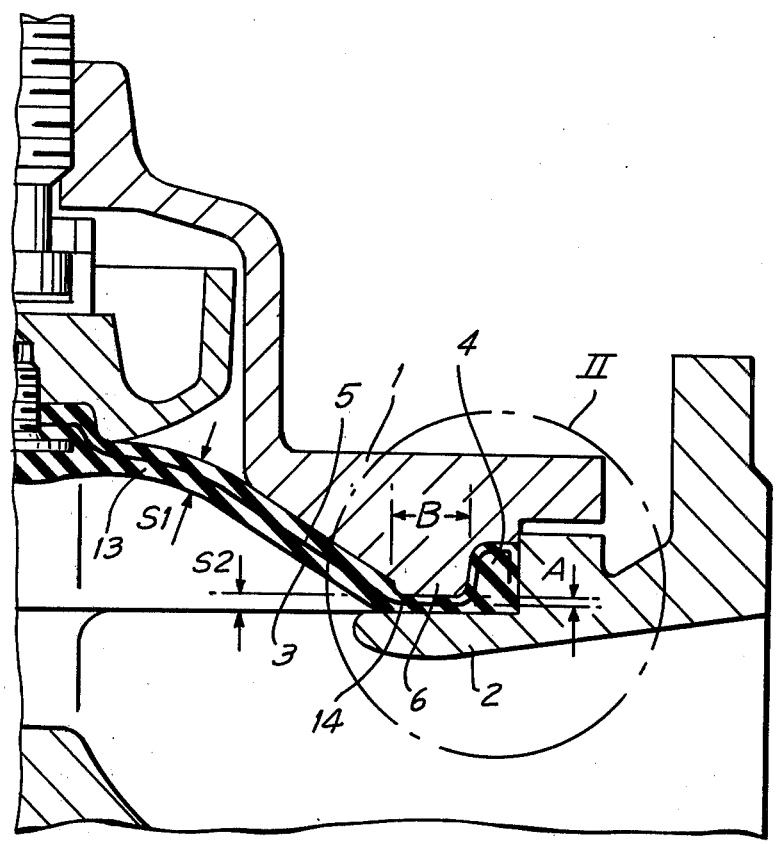
FIG. 1 is a partial view in longitudinal section of a diaphragm valve arrangement showing a first embodiment in accordance with the invention.

FIG. 1 illustrates one half of a diaphragm valve arrangement, the other half being removed for the sake of clarity. Reference numeral 1 identifies a first clamping member or hood, and reference numeral 2 indentifies a second clamping member or valve housing. The pair of clamping members 1, 2 have respective juxtaposed surfaces which define with one another a gap and which bound an interior space. One of the surfaces, e.g., the surface of the member 1 in FIG. 1, has a projecting portion 6 which extends across the gap towards the other of the surfaces, i.e., the surface of the member 2.

The diaphragm of flexible membrane 3 is provided in the interior of the diaphragm valve arrangement so that its center portion 13 having a thickness S1 spans the interior space of the valve. Exteriorly of the center portion 13, the diaphragm 3 has an outer clamped portion which is located in the gap.

The outer clamped portion comprises a region 14 of lesser thickness S2 as compared with the thickness S1 of the center portion 13, and an outwardly adjacent region 4 of greater thickness, also as compared with the thickness S1 of the center portion 13. The region 14, which is located intermediate the relatively greater sized center portion 13 and the region 4, is thus formed with a recess in which the projecting portion 6 is lodged.

The diaphragm 3 is clamped in position between the two clamping members, and the outer region 4 serves to additionally hold the diaphragm 3 in position during the flexing movement of the latter. The region of greater thickness 4 is itself lodged in a cavity formed by the juxtaposed clamping members 1, 2. Two sides of the cavity are formed by a cutout in the member 1, and the remaining sides of the cavity are bounded by the other clamping member 2, thus confining the region 4.

The diaphragm 3 is constituted of a flexible material, such as elastomeric rubber material and has a generally annular configuration. Moreover, the projection portion 6 and its cooperating recess extend in a generally circumferential direction.

The width B of recessed region 14 extends generally from the interior towards the exterior of the valve arrangement. The size of the width B is selected for a particular application depending upon the range of pressures which is normally expected to flex the diaphragm 3. Thus, for example, when the diaphragm 3 is to be subjected to light loading, then the width B of the recessed region 14 is preferably selected to be at least one-half of the thickness S2 of the recessed regions. For higher loading conditions, then the width B of the recessed region 14 is preferably selected to be at least 1½ times that of the thickness S2 of the recessed region. Finally, for even higher loading conditions, then the width B of the recessed region 14 is preferably selected to be at least three times that of the thickness S2 of the recessed region.

In order to prevent premature material fatigue of the diaphragm 3, reinforcing means 5 are provided. The reinforcing means 5 may be located within the diaphragm 3, and the insert may be constituted of a fabric or web-like material, preferably having a woven or net-like construction. Of course, other reinforcing means such as resilient sheet metal could be used. It is preferable to locate the reinforcing means 5 in the diaphragm 3 so that, in the recessed region 14, the reinforcing means 5 is spaced from the projecting portion 6 at a distance A which is preferably not more than one-half that of the thickness S2 of the recessed region 14.

In the embodiment of FIG. 1, the recessed region 14 has a generally constant thickness S2. However, the invention also comprises that the thickness of the recessed region 14 may vary in size. Thus, in the embodiment of FIG. 2, which shows only the encircled portion of FIG. 1, and where like numerals identify like parts, it will be seen that the thickness S2 of the recessed region 14, which is bounded on opposite sides by the juxtaposed surfaces F1 and F2, increases in size as one goes from the interior towards the exterior of the valve arrangement. That is, the recessed region 14 assumes a wedge-like shape whose innermost end has the thickness M1 which is less than the thickness M2 of its outermost end.

Figure 3:
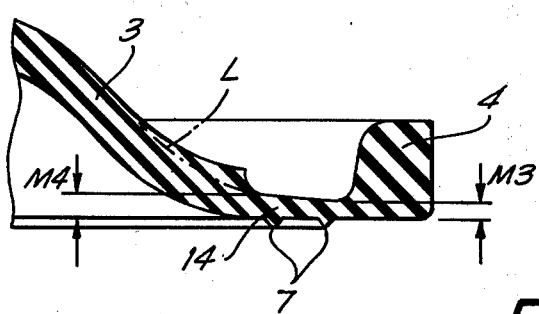
FIG. 3 is a partial view in enlarged vertical section of a diaphragm showing a third embodiment according to the present invention.

The embodiment of FIG. 3 similarly only illustrates the diaphragm 3 with the clamping portions 1 and 2 removed for clarity. Here, the thickness of the recessed region 14 increases in size as one goes from the exterior towards the interior of the valve arrangement. That is, the innermost end of the recessed region 14 has the thickness M4 which is greater than the thickness M3 of its outermost end.

An imaginary dot-dashed line L is illustrated which connects the curvature of the closed side of the recessed region 14 with the upper surface of the center portion 13 of the diaphragm 3. This line is intended to illustrate that the variation in size of the thickness of the recessed region 14 is continuous and uniform.

Sealing means 7 including a pair of annular sealing ribs are provided on the underside of the diaphragm 3 so as to abut against the clamping member 2 and effect a tight seal.

Figure 2:
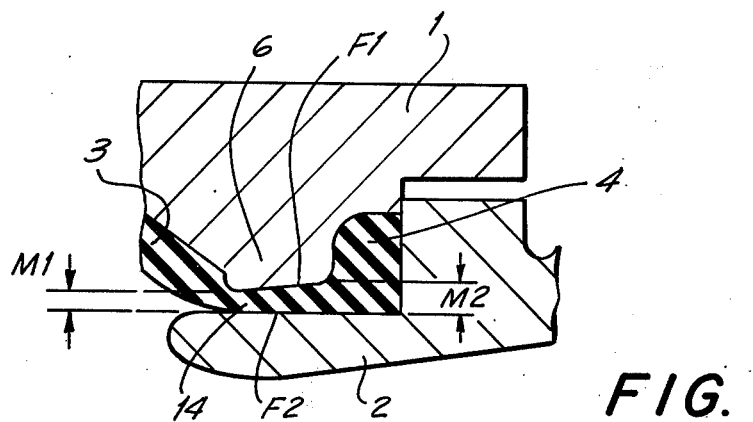
FIG. 2 is a partial view in enlarged vertical section of the encircled area II of FIG. 1 showing a second embodiment in accordance with the invention.

It is to be expressly understood in the embodiments of FIGS. 2 and 3 that the reinforcing means 5 have been omitted only for the sake of clarity.

Figure 4:
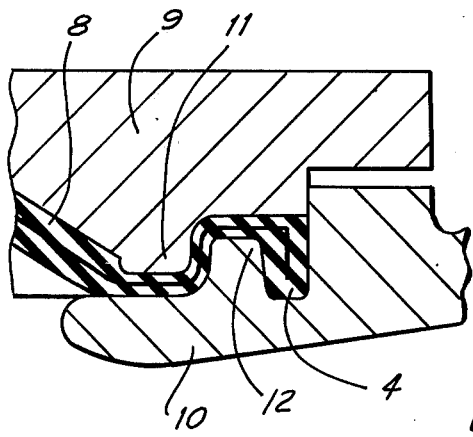
FIG. 4 is a partial view in enlarged vertical section of a diaphragm showing a fourth embodiment according to the invention.

In FIG. 4, another embodiment in accordance with the invention is illustrated. First clamping member 9 has a first projecting portion 11, and second clamping member 10 has a second projecting portion 12. The recessed region of the diaphragm 8 has an offset portion which is configurated, as shown, so that the recessed region now comprises two recesses, each of which receives one of the projecting portions 11, 12. The projections 11, 12 are parallel to each other and extend in opposite directions.

It will be understood that each of the elements described above, or two or more together, may also find a useful application in other types of constructions differing from the types described above.

While the invention has been illustrated and described as embodied in a diaphragm valve arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected be Letters Patent is set forth in the appended claims:

1. In a diaphragm valve arrangement, a combination comprising a pair of clamping members having respective juxtaposed surfaces which define with one another a gap and which bound an interior space, one of said surfaces having a projecting portion extending across said gap towards the other of said surfaces; and a diaphragm of resilient material, including an inner portion spanning said interior space and having a first region of substantially uniform thickness and an outer portion adapted to be clamped in said gap, said outer portion having a marginal second region spaced exteriorly of and being of greater thickness than said first region, and a recessed third region intermediate of and of lesser thickness than both of said first and second regions in unclamped condition so as to bound with said first and second regions a three-sided recess in which said projecting portion is lodged, said recessed region having relatively lesser material than said other regions due to the lesser thickness of said recessed region, to thereby substantially reduce the tendency of the material of said recessed region to flow towards said other regions when in clamped condition.

2. The combination as defined in claim 1, wherein said second region is located outwardly adjacent said recessed region.

3. The combination as defined in claim 1, wherein said projecting portion of said one surface and said recess have an annular configuration.

4. The combination as defined in claim 1, wherein the width of the recessed region is at least one-half that of the thickness of the recessed region.

5. The combination as defined in claim 1, wherein the width of the recessed region is at least 1½ times that of the thickness of the recessed region.

6. The combination as defined in claim 1, wherein the width of the recessed region of lesser thickness is at least three times that of the thickness of the recessed region.

7. The combination as defined in claim 1; and further comprising reinforcing means for reinforcing said diaphragm.

8. The combination as defined in claim 7, wherein said reinforcing means comprises an insert located within said diaphragm, said insert being located in the recessed region and spaced from said projecting portion at a distance which is not more than one-half that of the thickness of the recessed region.

9. The combination as defined in claim 1, wherein the thickness of the recessed region is substantially constant throughout its width.

10. The combination as defined in claim 1, wherein the thickness of the recessed region increases in size as seen along the direction from the interior towards the exterior of the diaphragm valve arrangement so that said recessed region is formed with a wedge-like shape.

11. The combination as defined in claim 1, wherein the thickness of the recessed region increases in size as seen along the direction from the exterior towards the interior of the diaphragm valve arrangement.

12. The combination as defined in claim 11, wherein the increase in thickness of said recessed region is continuous.

13. The combination as defined in claim 1; and further comprising sealing means at said outer portion on the side of said diaphragm which is opposite the side formed with said recess, said sealing means including at least one annular sealing rib.

14. The combination as defined in claim 1, wherein the other of said surfaces has another projecting portion which extends across said gap towards said one surface in a direction opposite to the extension of the first-mentioned projecting portion, and wherein said recessed region is formed with an additional recess having an open side which faces towards said other projecting portion and in which the latter is lodged.

* * * * *